US012697963B2

(12) United States Patent
Jung et al.

(10) Patent No.: US 12,697,963 B2
(45) Date of Patent: Aug. 4, 2026

(54) SYSTEM AND METHOD FOR CONTROLLING PARKING OF AUTONOMOUS VEHICLE

(71) Applicant: VESTELLALAB INC., Gyeonggi-do (KR)

(72) Inventors: Sang Su Jung, Gyeonggi-do (KR); Yung Ji Choi, Gyeonggi-do (KR); Young Soo Lee, Gyeonggi-do (KR); Dhananjay Singh, Gyeonggi-do (KR)

(73) Assignee: VESTELLALAB INC., Gyeonggi-do (KR)

( * ) Notice: Subject to any disclaimer, the term of this patent is extended or adjusted under 35 U.S.C. 154(b) by 14 days.

(21) Appl. No.: 18/842,785

(22) PCT Filed: Jun. 5, 2023

(86) PCT No.: PCT/KR2023/007700
§ 371 (c)(1),
(2) Date: Aug. 29, 2024

(87) PCT Pub. No.: WO2023/243918
PCT Pub. Date: Dec. 21, 2023

(65) Prior Publication Data
US 2025/0162574 A1 May 22, 2025

(30) Foreign Application Priority Data
Jun. 13, 2022 (KR) ........................ 10-2022-0071637

(51) Int. Cl.
*G08G 1/14* (2006.01)
*B60W 30/06* (2006.01)
(Continued)

(52) U.S. Cl.
CPC ........ *B60W 30/06* (2013.01); *B60W 60/0015* (2020.02); *G06V 20/52* (2022.01); *G06V 2201/08* (2022.01)

(58) Field of Classification Search
CPC .. B60W 30/06; B60W 60/0015; B60W 30/08; B60W 30/10; B60W 40/02;
(Continued)

(56) References Cited

U.S. PATENT DOCUMENTS 10,286,904 B2 * 5/2019 Yaldo ..................... G08G 1/143
2018/0072345 A1 3/2018 Nicodemus et al.
(Continued)

FOREIGN PATENT DOCUMENTS

JP 2018034540 3/2018
KR 1020170077319 7/2017
(Continued)

OTHER PUBLICATIONS

"Office Action of Korea Counterpart Application", issued on Mar. 20, 2024, with English translation thereof, p. 1-p. 8.
(Continued)

*Primary Examiner* — Anh V La
(74) *Attorney, Agent, or Firm* — JCIPRNET

(57) ABSTRACT

To provide a system and a method, for controlling parking of an autonomous vehicle, the system includes a vehicle control device including a processor and a memory storing instructions executable by the processor, in which the processor is further configured to execute the instructions to obtain information related to parking of the autonomous vehicle from a sensor included in the autonomous vehicle or from an infrastructure sensor outside the autonomous vehicle, determine a parking space, based on the information related to parking of the autonomous vehicle, set a parking route from a current position of the autonomous vehicle to
(Continued)

the parking space, and control parking of the autonomous vehicle, based on the parking route.

10 Claims, 10 Drawing Sheets

(51) Int. Cl.
  *B60W 60/00* (2020.01)
  *G06V 20/52* (2022.01)
(58) Field of Classification Search
  CPC ..... B60W 60/0016; B60W 2050/0005; B60W 2520/06; B60W 2554/4029; G06V 20/52; G06V 2201/08; B62D 15/0285; G06F 9/06
  USPC ...................... 340/932.2, 933, 937, 988, 990
  See application file for complete search history.

(56) References Cited

U.S. PATENT DOCUMENTS

| | | | | |
|---|---|---|---|---|
| 2020/0209877 A1* | 7/2020 | Yoon | .................... | G05D 1/0251 |
| 2020/0339196 A1* | 10/2020 | Jang | ..................... | B60W 40/06 |
| 2021/0009111 A1* | 1/2021 | Kang | ................ | B60W 60/0051 |
| 2021/0107514 A1* | 4/2021 | Watanabe | ......... | B60W 60/0015 |
| 2021/0245735 A1 | 8/2021 | Wang | | |
| 2022/0366792 A1* | 11/2022 | Gaß | ....................... | B60Q 9/008 |

FOREIGN PATENT DOCUMENTS

| | | |
|---|---|---|
| KR | 1020200087319 | 7/2020 |
| KR | 1020200130883 | 11/2020 |

OTHER PUBLICATIONS

"Notice of Final Rejection of Korea Counterpart Application", issued on Jun. 27, 2024, with English translation thereof, p. 1-p. 9.

* cited by examiner

EXTERNAL INFORMATION REQUIRED TO BE RECOGNIZED

HAZARDOUS SITUATION

DIRECTION AND POSTURE

POSITION AND DISTANCE OF SURROUNDING OBSTACLE

SIZE OF SURROUNDING STRUCTURE

IN-VEHICLE ATTACHED SENSOR 110

VEHICLE CONTROL APPARATUS 400

OUT-OF-VEHICLE INFRASTRUCTURE SENSOR 300

INFRASTRUCTURE ATTACHED TYPE (STATIONARY TYPE)

MOBILE TYPE

A

B

100

71

SYSTEM AND METHOD FOR CONTROLLING PARKING OF AUTONOMOUS VEHICLE

CROSS-REFERENCE TO RELATED APPLICATION

This application is a 371 of international application of PCT application serial no. PCT/KR2023/007700, and filed on Jun. 5, 2023, which claims priority benefit of Korea (KR) Patent Application No. 10-2022-0071637, and filed on Jun. 13, 2022. The entirety of each of the above mentioned patent applications is hereby incorporated by reference herein and made a part of this specification.

TECHNICAL FIELD

Embodiments of the present disclosure relate to a system and a method, for controlling parking of an autonomous vehicle.

BACKGROUND ART

In order for an autonomous vehicle to reach its destination, route guidance information for the autonomous vehicle is required. The autonomous vehicle may travel to the destination, based on the route guidance information, through autonomous driving.

The autonomous vehicle may collect information about its surroundings of the vehicle by using a sensor or the like included therein, and autonomously travel using this collected information. However, verification with respect to real-time vehicle odometry, such as the exact position and pose of the vehicle relative to its surroundings, or information about blind spots, may be required, such that there is a limit to safe and efficient autonomous driving merely with information collected in the vehicle. In particular, the types and number of sensors, the autonomous driving scheme and operation (e.g., SAE level), etc. may differ with each manufacturer, and thus there is a need for technology to assist with safe driving and parking within specific infrastructure.

To accurately park the autonomous vehicle in a certain parking space (e.g., a parking spot), the importance of information collected from inside and outside the vehicle and autonomous parking control using the information is highlighted.

SUMMARY OF INVENTION

Technical Problem

The present disclosure is provided to solve several problems including the foregoing problems and aims to provide a system and method for controlling the parking of an autonomous vehicle. However, such a problem is merely an example, and the scope of the disclosure is not limited thereto.

Technical Solution

According to an aspect of the present disclosure, a system for controlling the parking of an autonomous vehicle includes a vehicle control device comprising a processor and a memory storing instructions executable by the processor, in which the processor is further configured to execute the instructions to obtain information related to the parking of the autonomous vehicle from a sensor included in the autonomous vehicle or from an infrastructure sensor outside the autonomous vehicle, determine a parking space, based on the obtained parking information, set a parking route from the current position of the autonomous vehicle to the parking space, and control the parking of the autonomous vehicle based on the parking route.

The processor may be further configured to execute the instructions to obtain information about the position of the autonomous vehicle in space measured by the infrastructure sensor and the direction in which a front portion of the autonomous vehicle is oriented, and obtain information about the absolute and relative positions of at least one available parking space for the autonomous vehicle in space, measured by the infrastructure sensor, and the size and a parking direction of the available parking space.

The processor may be further configured to execute the instructions to determine, as a parking space, an available parking space corresponding to a safe travel route calculated based on the position and the direction of the autonomous vehicle, the absolute and relative positions of the available parking space, and the size and the parking direction of the available parking space, and plan and set the parking route to the parking space.

The processor may be further configured to executing the instructions to compare the parking route with the current position of the autonomous vehicle in real time and thereby correct the parking route.

The processor may be further configured to execute the instructions to obtain first obstacle information regarding the absolute position and a size of an obstacle in space, measured by the infrastructure sensor, second obstacle information regarding the relative position between the obstacle and the autonomous vehicle, and third obstacle information regarding the relative direction of a direction in which a front portion of the autonomous vehicle is oriented, with respect to the obstacle.

The processor may be further configured to execute the instructions to verify the information obtained from the sensor included in the autonomous vehicle, based on the first obstacle information, the second obstacle information, and the third obstacle information.

The processor may be further configured to execute the instructions to remove a blind spot of the sensor included in the autonomous vehicle, based on the first obstacle information, the second obstacle information, and the third obstacle information.

According to an aspect of the present disclosure, a method of controlling parking of an autonomous vehicle includes obtaining information related to parking of the autonomous vehicle from a sensor included in the autonomous vehicle or from an infrastructure sensor outside the autonomous vehicle, determining a parking space, based on the information related to parking of the autonomous vehicle, and setting a parking route from a current position of the autonomous vehicle to the parking space, and controlling parking of the autonomous vehicle, based on the parking route.

The obtaining of the information related to parking of the autonomous vehicle may include obtaining information about a position of the autonomous vehicle in space measured by the infrastructure sensor, and a direction in which a front portion of the autonomous vehicle is oriented, and obtaining information about absolute and relative positions of at least one available parking space for the autonomous vehicle in space, measured by the infrastructure sensor, and a size and a parking direction of the available parking space.

The setting of the parking route may include determining, as a parking space, an available parking space corresponding to a safe travel route calculated based on the position and the direction of the autonomous vehicle, the absolute and relative positions of the available parking space, and the size and the parking direction of the available parking space, and planning and setting the parking route to the parking space.

The controlling of parking may include comparing the parking route with the current position of the autonomous vehicle in real-time and thereby correcting the parking route.

The obtaining of the information related to the parking of the autonomous vehicle may include obtaining first obstacle information regarding the absolute position and size of an obstacle in space, measured by the infrastructure sensor, obtaining second obstacle information regarding the relative position between the obstacle and the autonomous vehicle, and obtaining third obstacle information regarding the relative direction of a direction in which a front portion of the autonomous vehicle is oriented, with respect to the obstacle.

The setting of the parking route may include verifying the information obtained from the sensor included in the autonomous vehicle, based on the first obstacle information, the second obstacle information, and the third obstacle information.

The setting of the parking route may include removing a blind spot of the sensor included in the autonomous vehicle, based on the first obstacle information, the second obstacle information, and the third obstacle information.

According to an aspect of the disclosure, a computer program is provided which is stored on a recording medium for executing the above-described method by using a computer.

Other aspects, features and advantages not described above will become apparent from the detailed description, claims, and drawings for carrying out the present disclosure below.

Advantageous Effects

According to an embodiment of the present disclosure as described above, an apparatus and method for controlling the parking of an autonomous vehicle, which enables the autonomous vehicle to be effectively parked in a parking space, may be implemented. However, the scope of the present disclosure is not limited by these effects.

BRIEF DESCRIPTION OF DRAWINGS

The present disclosure may be easily understood by a combination of the following detailed description and the accompanying drawings, and reference numerals may correspond to structural elements.

DESCRIPTION OF EMBODIMENTS

Figure 1:
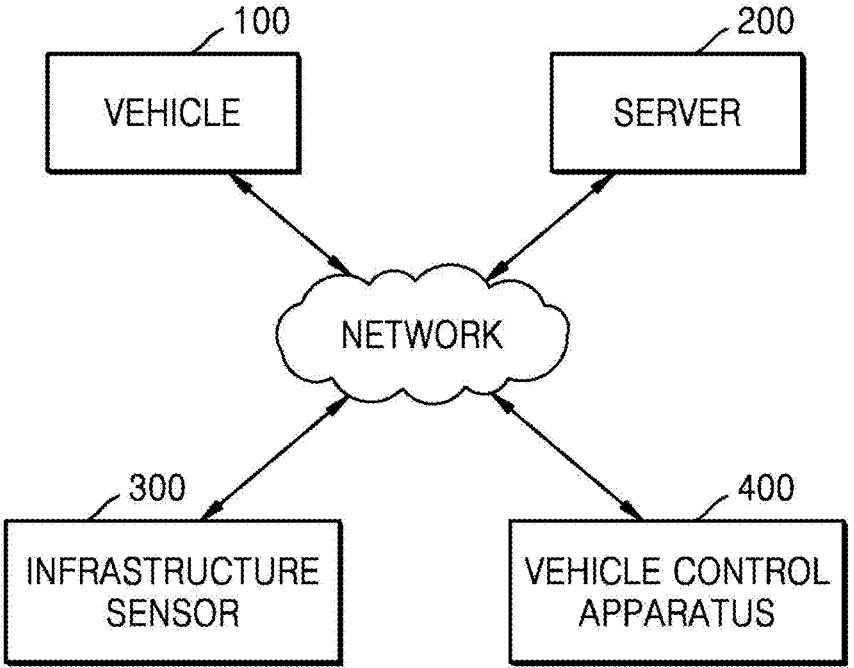
FIG. 1 illustrates an example for describing a process, performed by a vehicle control system, of communicating with a vehicle control apparatus, a server, an infrastructure sensor, and an autonomous vehicle to park the autonomous vehicle in a parking space.

The present disclosure may have various modifications thereto and various embodiments, and thus particular embodiments will be illustrated in the drawings and described in detail in a detailed description.

Effects and features of the present disclosure, and methods for achieving them will become clear with reference to the embodiments described later in detail together with the drawings. However, the present disclosure is not limited to the embodiments disclosed below and may be implemented in various forms.

Hereinafter, embodiments of the present disclosure will be described in detail with reference to the accompanying drawings, and in description with reference to the drawings, the same or corresponding components are given the same reference numerals, and redundant description thereto will be omitted.

In the following embodiments, the terms such as first, second, etc., have been used to distinguish one component from other components, rather than limiting. Singular forms include plural forms unless apparently indicated otherwise contextually. Herein, the terms "include", "have", or the like, are intended to mean that there are features, or components, described herein, but do not preclude the possibility of adding one or more other features or components.

In the drawings, the size of components may be exaggerated or reduced for convenience of description. For example, since the size and thickness of each component shown in the drawings are arbitrarily shown for convenience of description, the present disclosure is not necessarily limited to the illustrated bar.

In the following embodiments, when a portion, such as a region, a component, a portion or unit, a block, a module, etc., is present on or above another portion, this case may include not only a case where it is directly on the other portion, but also a case where another region, component, portion or unit, block, module, etc., is arranged between the portion and the other portion. When a region, a component, a portion or unit, a block, a module, etc., are connected, this case may include not only a case where a region, a component, a portion or unit, a block, and a module are directly connected, but also a case where they are connected indirectly by another region, component, portion or unit, block, and module arranged there between.

A "vehicle control apparatus" may mean an apparatus used to park an autonomous vehicle in a parking space. In the vehicle control apparatus, a program used to park the autonomous vehicle in the parking space may be installed. For example, the vehicle control apparatus may perform an operation of parking the autonomous vehicle in the parking space, based on information transmitted and received through a server, an infrastructure sensor, and the autonomous vehicle and information input from the program. For example, the vehicle control apparatus may be a device mounted on the autonomous vehicle. Alternatively, the vehicle control apparatus may be embedded in a processor of the autonomous vehicle. Alternatively, the vehicle control apparatus may be a user terminal of a user and may be a mobile terminal device, such as a smartphone, or an external operation server. However, the present disclosure is not limited thereto, and the vehicle control apparatus may be included in a system for controlling parking of a plurality of autonomous vehicles.

The "autonomous vehicle" or the "vehicle" may mean a vehicle parked in a parking space according to guidance of the vehicle control apparatus. In the autonomous vehicle, at least one sensor that collects surrounding information of the vehicle may be installed. For example, the autonomous vehicle may recognize a surrounding object or person of the vehicle, a lane, etc., by using a sensor included in the vehicle to exchange data with the server and the vehicle control apparatus through a network. The autonomous vehicle may park in the parking space based on the information transmitted and received through the server, the infrastructure sensor, and the vehicle control apparatus and the information input from the program.

The "server" may mean a server device used to park the autonomous vehicle in the parking space. In the server, a program used to park the autonomous vehicle in the parking space may be installed. For example, in the server, information for creating a map on a parking route of the autonomous vehicle may be stored.

The "infrastructure sensor" may include at least one sensor included in an external infrastructure of the autonomous vehicle to collect the surrounding information of the vehicle. For example, the infrastructure sensor may include an attachable-type camera sensor. Alternatively, the infrastructure sensor may include a mobile sensor such as a drone, etc.

FIG. 1 illustrates an example for describing a process, performed by a vehicle control system, of communicating with a vehicle control apparatus, a server, an infrastructure sensor, and an autonomous vehicle to park the autonomous vehicle in a parking space.

Referring to FIG. 1, the vehicle control system may include a vehicle control apparatus 400. The vehicle control system may include the vehicle control apparatus 400 and an infrastructure sensor 300. The vehicle control system may include the server 200.

The server 200 may form network connection with the infrastructure sensor 300 and the autonomous vehicle 100. Alternatively, the vehicle control apparatus 400 may form network connection with the infrastructure sensor 300, the autonomous vehicle 100, and the server 200.

The vehicle control apparatus 400 may be connected to the server 200 through the network. The vehicle control apparatus 400 may be connected to the vehicle 100 through the network. The vehicle 100 may also be connected to the server 200 and the network. The infrastructure sensor 300 may be connected to the vehicle control apparatus 400 through the network. The infrastructure sensor 300 may be connected to the vehicle 100 through the network. While one vehicle control apparatus, one server, one infrastructure sensor, and one vehicle are connected to the network in FIG. 1 as an example, a plurality of vehicle control apparatuses, a plurality of servers, a plurality of infrastructure sensors, and/or a plurality of vehicles may be connected to the network. As an example, one vehicle control apparatus may be connected to the plurality of infrastructure sensors and/or the plurality of vehicles through the network.

Figure 2:
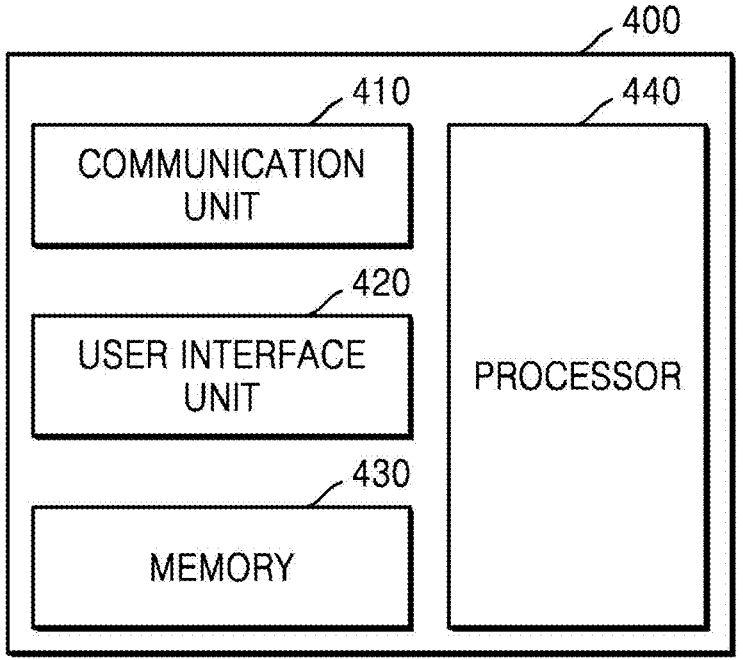
FIG. 2 is a block diagram schematically showing components of a vehicle control apparatus, in accordance with an embodiment of the present disclosure.

FIG. 2 is a block diagram schematically showing components of a vehicle control apparatus, according to an embodiment of the present disclosure.

Referring to FIG. 2, the vehicle control apparatus 400 may include a communication unit 410, a user interface unit 420, a memory 430, and a processor 440. Hereinafter, the aforementioned components will be described.

The communication unit 410 may include a communication module supporting one of various wired/wireless communication methods. For example, the communication module may be in the form of a chipset, or a sticker/barcode (e.g., a sticker including an NFC tag) including information required for communication. The communication module may be a short-range communication module or a wireless communication module.

For example, the communication unit 410 may support at least one of a wireless local area network (LAN), Wireless Fidelity (Wi-Fi), Wi-Fi Direct (WFD), Bluetooth, Bluetooth Low Energy (BLE), a wired LAN, near field communication (NFC), Zigbee infrared data association (IrDA), 3rd-Generation (3G), 4th-Generation (4G), and 5-th Generation (5G).

The user interface unit 420 may include an input unit for receiving an input for controlling an operation of the vehicle control apparatus 400 from the user and an output unit for displaying information such as a result corresponding to the operation of the vehicle control apparatus 400, a state of the vehicle control apparatus 400, etc. For example, the user interface unit 420 may include a manipulation panel for receiving a user input, a display panel for displaying a screen, etc. Specifically, the input unit may include devices capable of receiving various forms of user inputs, for example, a keyboard, a physical button, a touch screen, a camera, a microphone, etc.

The output unit may include, for example, a display panel, a speaker, etc. However, without being limited thereto, the user interface unit 420 may include a device supporting various inputs and outputs.

The memory 430 may store software or a program. Herein below, software or a program may indicate software or a program used by a device such as the vehicle 100, the server 200, the infrastructure sensor 300, and the vehicle control apparatus 400, etc. For example, the memory 430 may store instructions regarding an operating method of the vehicle control apparatus 400 which executes an application for guiding the autonomous vehicle to the destination and displays route guidance information according to information of the vehicle control apparatus 400 through the application.

The processor 440 may control an overall operation of the vehicle control apparatus 400 and include at least one processor such as a central processing unit (CPU), etc. The processor 440 may include at least one processors specialized for each function or may be one integrated processor. For example, the processor 440 may call at least one application programming interface (API) used to perform an operation for parking of the autonomous vehicle. The processor 440 may execute a program stored in the memory 430, read data or a file stored in the memory 430, or store new data or file in the memory 430.

The processor 440 may receive information on the traveling route of the autonomous vehicle from the server 200, the infrastructure sensor 300, and/or vehicle 100 through the communication unit 410.

The processor 440 may calculate an optimal route to the parking space for the autonomous vehicle based on the received information and decide and determine a corresponding available parking space. The processor 440 may also guide the autonomous vehicle to the parking space by using information about the optimal route.

Figure 3:
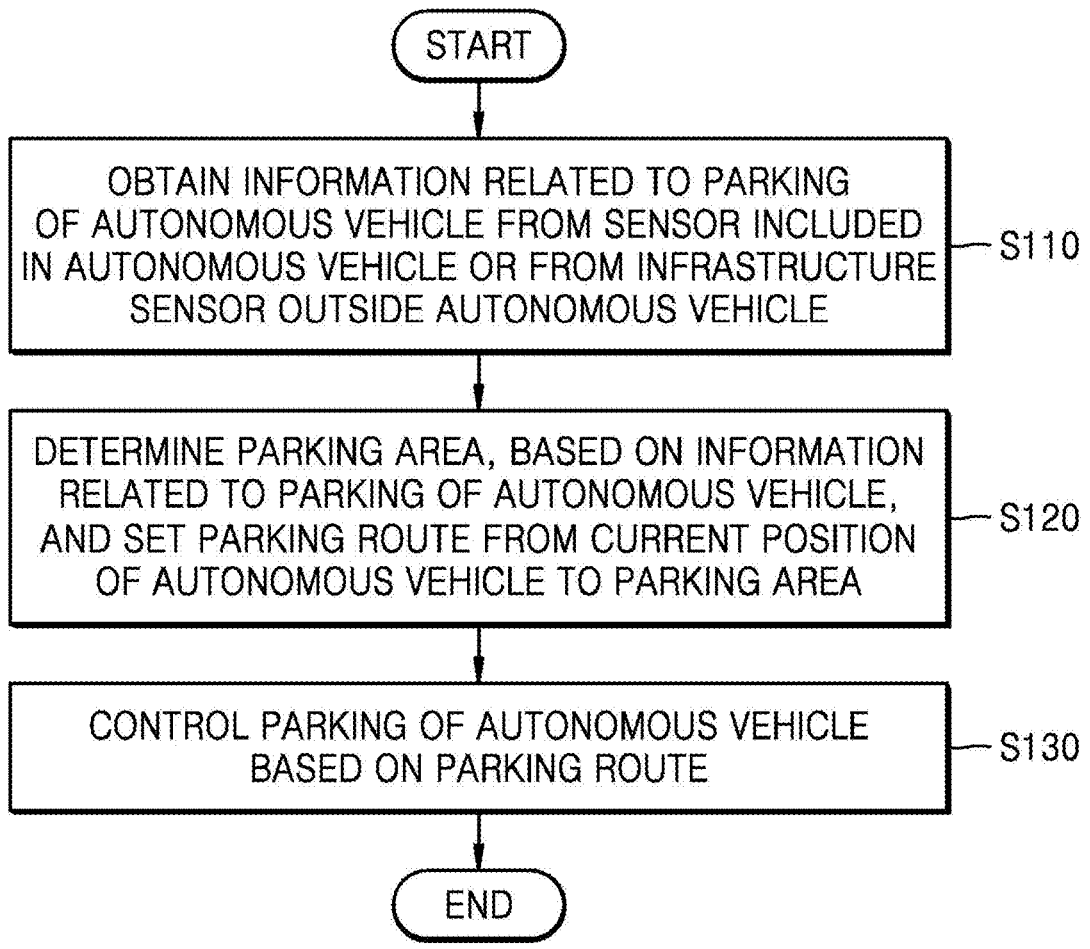
FIG. 3 is a flowchart of an example for describing a vehicle control method for an autonomous vehicle, executed by a vehicle control apparatus.

FIG. 3 is a flowchart of an example for describing a vehicle control method for an autonomous vehicle, performed by a vehicle control apparatus. However, the present disclosure is not limited thereto, and some operations of the vehicle control apparatus 400 may also be performed by the server 200.

Referring to FIG. 3, in operation S110, the processor 440 may obtain information related to parking of the autonomous vehicle from the sensor included in the autonomous vehicle or from an infrastructure sensor outside the autonomous vehicle. For example, the processor 440 may obtain a parking spot, an obstacle, a surrounding vehicle, etc., from an in-vehicle attached sensor. The processor 440 may also obtain information related to a position of the vehicle, a posture of the vehicle, the parking spot, an obstacle, a surrounding vehicle, etc., from the out-of-vehicle infrastructure sensor.

The processor 440 according to an embodiment of the present disclosure may obtain information about a position of the autonomous vehicle in space, measured by the infrastructure sensor. For example, the infrastructure sensor may be an attachable-type camera or a mobile camera included in a parking lot. The infrastructure sensor may collect information of all parking spots, lanes, vehicles, and obstacles over the entire parking lot in relation to parking of the autonomous vehicle. For example, the processor 440 may obtain information about the current position of the autonomous vehicle in the parking lot, measured by the infrastructure sensor.

The processor 440 may also obtain information about a direction in which a front portion of the autonomous vehicle is oriented. For example, the processor 440 may obtain information about the posture of the autonomous vehicle. For example, the processor 440 may also obtain information about the posture of the autonomous vehicle based on the direction in which the front portion of the autonomous vehicle is oriented.

The processor 440 may also obtain information about the absolute and relative positions of at least one available parking space of the autonomous vehicle in space, measured by the infrastructure sensor, the size of the available parking space, and a parking direction. For example, the processor 440 may obtain information about the absolute and relative positions of the plurality of available parking spaces of the parking lot, measured by the infrastructure sensor. The processor 440 may obtain information about the size and parking direction of each available parking space of the parking lot, measured by the infrastructure sensor. Herein, the parking direction may indicate the direction of horizontal parking or vertical parking in which the vehicle is parked in the available parking space (e.g., the parking spot) based on the vehicle's traveling route.

The processor 440 according to an embodiment of the present disclosure may obtain first obstacle information about an absolute position and a size of an obstacle in space, measured by the infrastructure sensor. For example, the first obstacle information may include information about the absolute position of the obstacle in the parking lot and the size of the obstacle. For example, the processor 440 may obtain the first obstacle information about a position and a size of an obstacle in the parking lot, measured by the infrastructure sensor.

The processor 440 may obtain second obstacle information about a relative position between the obstacle and the autonomous vehicle. For example, the second obstacle information may include a relative position (e.g., a distance) between the obstacle and the autonomous vehicle in the parking lot. For example, the processor 440 may obtain information about the distance between the obstacle and the autonomous vehicle based on the position of the autonomous vehicle and the position of the obstacle in the parking lot.

The processor 440 may also obtain third obstacle information regarding a relative direction of a direction in which a front portion of the autonomous vehicle is oriented, with respect to the obstacle. For example, the third obstacle information may include a relative direction between the obstacle and the autonomous vehicle in the parking lot. For example, the processor 440 may also obtain information about the relative direction between the front portion of the autonomous vehicle and the obstacle, based on the direction in which the front portion of the autonomous vehicle is oriented.

In operation S120, the processor 440 may determine a parking space, based on information related to parking of the autonomous vehicle. The processor 440 may plan and set a parking route from the current position of the autonomous vehicle to the parking space. Herein, planning may indicate a process of finding a plurality of solutions. Setting may also indicate a process of finding an appropriate solution among several solutions.

The processor 440 according to an embodiment of the present disclosure may determine, as the parking space, an available parking space corresponding to a parking space in which at least one solution is present for a stable travel route, based on a position and a direction of the autonomous vehicle, absolute and relative positions of the available parking space, and a size and a parking direction of the available parking space.

The processor 440 according to an embodiment of the present disclosure may determine, as the parking space, the available parking space corresponding to the shortest traveling route, based on the position and the direction of the autonomous vehicle and the position and the parking direction of the available parking space. For example, the processor 440 may decide and set, as the parking space, an available parking space in which there is a safe travel route from the vehicle to the available parking space (there is at least one solution to an equation), based on the position of the vehicle, the direction of the vehicle, the position of the available parking space, and the parking direction of the available parking space, and determine an optimal route among safe travel routes.

The processor 440 according to an embodiment of the present disclosure may follow a route that may be generated in a traveling process by comparing the parking route with the current position of the autonomous vehicle in real time during parking, calculate an odometry bias and thereby correct the parking route.

The processor 440 according to an embodiment of the present disclosure may remove a blind spot of a sensor included in the autonomous vehicle, based on the first obstacle information, the second obstacle information, and the third obstacle information. For example, the processor 440 may compare/verify information from the sensor included in the vehicle or remove the blind spot of the sensor included in the vehicle, based on information about a position and a size of an obstacle in the parking lot, information about a distance between the obstacle and the autonomous vehicle in the parking lot, and information about a relative direction between the obstacle and the autonomous vehicle in the parking lot.

In operation S130, the processor 440 may remove parking of the autonomous vehicle based on the parking route. For example, the processor 440 may control autonomous parking of the vehicle based on the parking route from the vehicle to the parking space. For example, the processor 440 may control autonomous parking of the vehicle based on the current posture (i.e. odometry) and the parking route of the vehicle.

Figure 4:
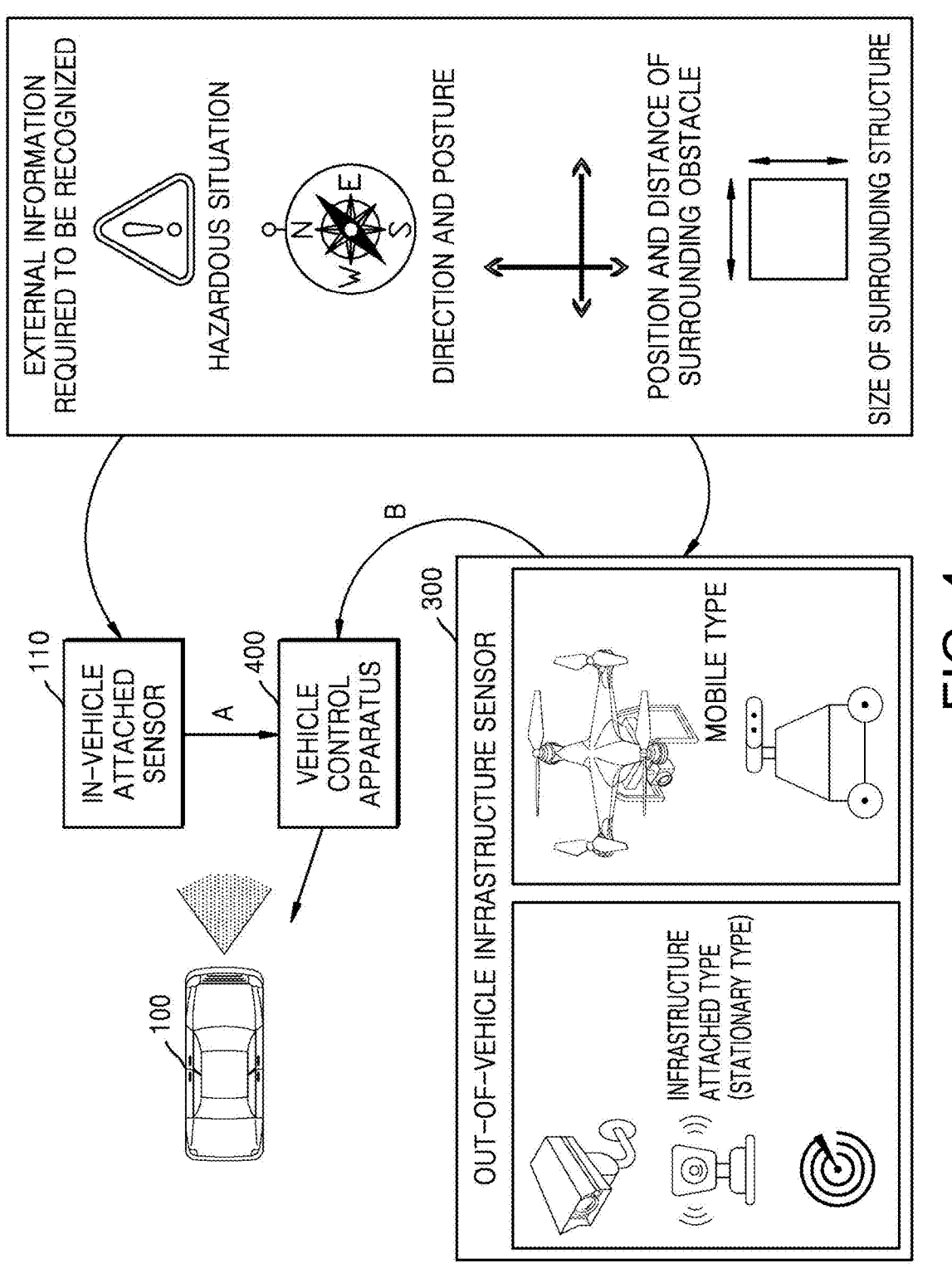
FIG. 4 illustrates an example for describing a method, performed by a vehicle control apparatus, of parking an autonomous vehicle using an in-vehicle attached sensor and an out-of-vehicle infrastructure sensor.

FIG. 4 illustrates an example for describing a method, performed by a vehicle control apparatus, of parking an autonomous vehicle by using an in-vehicle attached sensor and an out-of-vehicle infrastructure sensor.

Referring to FIG. 4, the vehicle control apparatus 400 according to an embodiment of the present disclosure may obtain external information related to parking of the vehicle from the in-vehicle attached sensor 110 and the infrastructure sensor 300, such as lidars, radars, cameras, ultrasonic waves, inertial measurement units (IMUs), etc. For example, the external information related to parking of the vehicle may include a hazardous situation, a direction and a posture of the vehicle, a position and a distance of a surrounding obstacle, a size of a surrounding structure, etc.

According to the present disclosure, accurate information about a direction and a posture of the vehicle, which are difficult to identify merely with an in-vehicle attached sensor, may be obtained. Moreover, by obtaining information about a position, a distance, and a size of an obstacle, which are difficult to identify merely with an in-vehicle attached sensor, information from the in-vehicle attached sensor may be verified or a blind spot of the sensor may be removed.

For example, a form and a type of information obtained by the vehicle control apparatus 400 from the in-vehicle attached sensor 110 and the infrastructure sensor 300 may be an acceleration, a speed, a distance, a frequency, a pseudo sensor signal (virtual signal), a coordinate on a map, a point cloud precise map, or an occupancy grid map. For example, the form and the type of the information obtained by the vehicle control apparatus 400 from the in-vehicle attached sensor 110 and the infrastructure sensor 300 may depend on a type of a sensor and may not be limited to the form.

Figure 5:
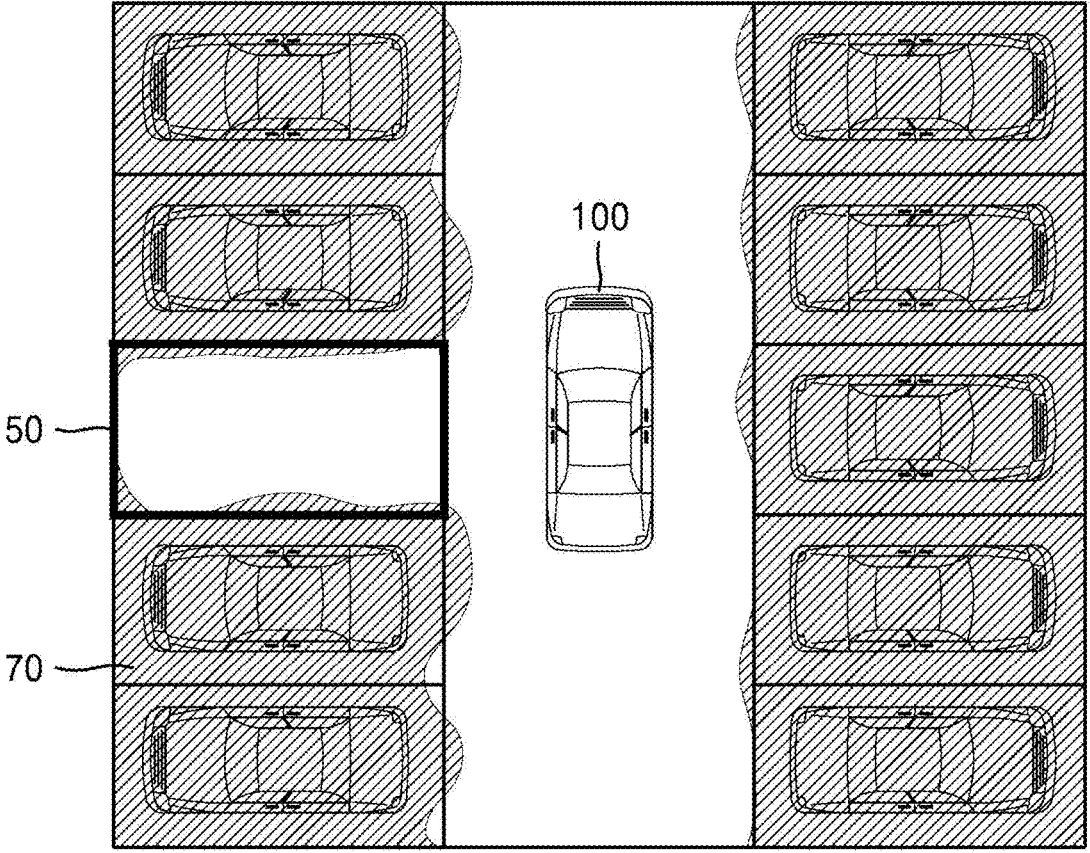
FIG. 5 illustrates an example for describing information collected by a vehicle control apparatus using an in-vehicle attached sensor.
Figure 6:
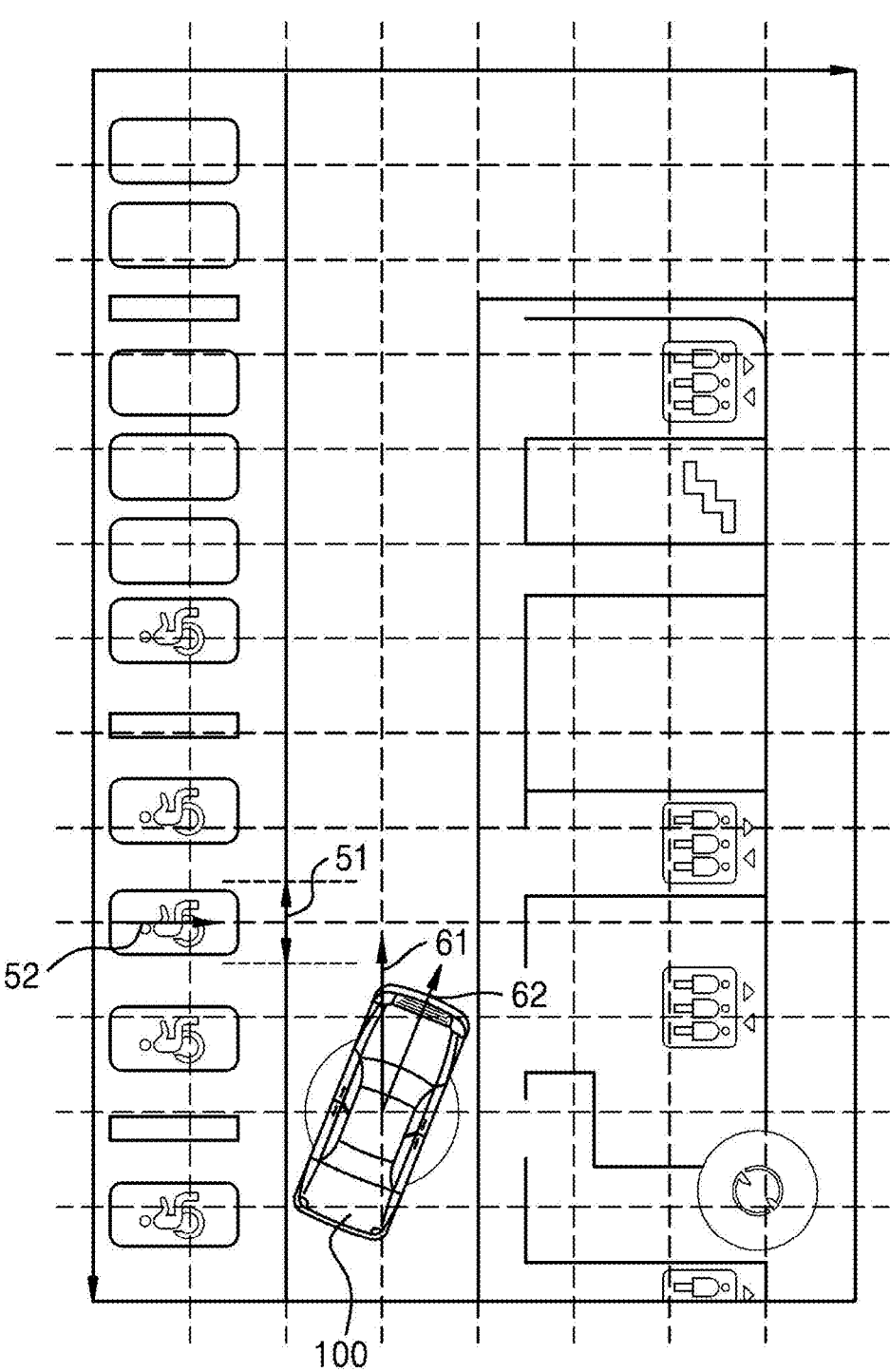
FIG. 6 illustrates an example for describing information collected by a vehicle control apparatus using an out-of-vehicle infrastructure sensor.

FIG. 5 illustrates an example for describing information collected in a vehicle control apparatus by using an in-vehicle attached sensor. FIG. 6 illustrates an example for describing information collected in a vehicle control apparatus by using an out-of-vehicle infrastructure sensor.

Referring to FIG. 5, the vehicle control apparatus 400 according to an embodiment of the present disclosure may obtain information about a parking space 50 and an unavailable parking space 70 by using the in-vehicle attached sensor 110 of the vehicle 100. Referring to FIG. 6, the vehicle control apparatus 400 according to an embodiment of the present disclosure may obtain information about a parking space size 51, a parking direction 52 of the parking space, a direction 62 of the vehicle front portion, and a traveling direction 61 of the vehicle 100, by using the infrastructure sensor 300 outside the vehicle 100.

For example, as shown in FIG. 6, the vehicle control apparatus 400 may obtain information about a distance between the parking space and the current vehicle, a final parking posture (e.g., a direction) in the parking space, the current posture (e.g., a direction) or position of the vehicle.

For example, the vehicle control apparatus 400 may obtain drawing information about the exact sizes and directions of vehicles, parking spaces, obstacles, etc., on the infrastructure through communication with the infrastructure sensor 300. For example, as shown in FIGS. 5 and 6, the vehicle control apparatus 400 may obtain a real-time dynamic information digital map available by the autonomous vehicle. For example, the vehicle control apparatus 400 may analyze a recognized sensor result by using deep learning such as a semantic segmentation algorithm (SW), etc., to identify an available/unavailable parking space. For example, the vehicle control apparatus 400 may recognize the parking space by using an around-view monitor (AVM) image. The vehicle control apparatus 400 may also recognize a position and a direction of the parking space. For example, the vehicle control apparatus 400 may recognize the position of the parking space by using a YOLO v3 network (a center of a bounding box). The vehicle control apparatus 400 may also recognize the direction of the parking space by using a Hough line detection algorithm, etc.

For example, as shown in FIGS. 5 and 6, the vehicle control apparatus 400 according to an embodiment of the present disclosure may perform autonomous parking of the vehicle through controlling of the position and posture of the vehicle, by using the information obtained from the in-vehicle attached sensor 110 and the infrastructure sensor 300.

Figure 7A:
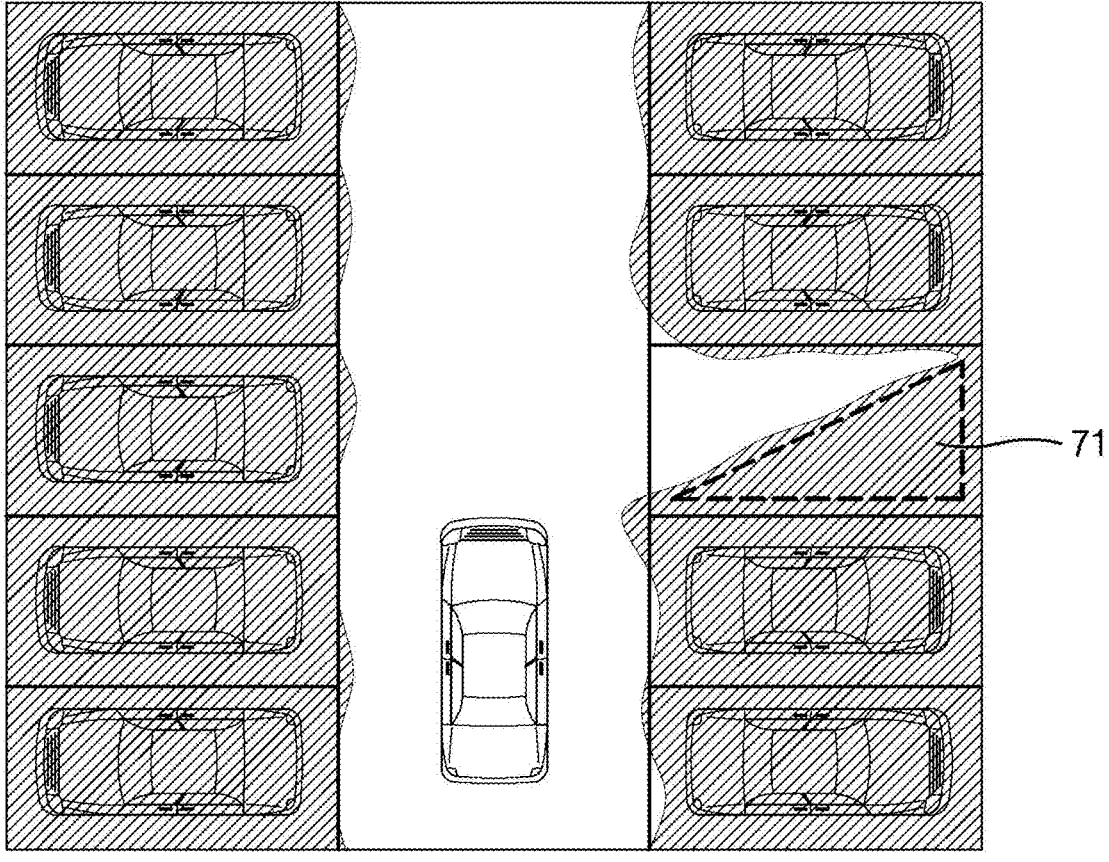
FIGS. 7A and 7B illustrate an example for eliminating blind spots in a vehicle control apparatus using information collected through an in-vehicle attached sensor and an out-of-vehicle infrastructure sensor.
Figure 7B:
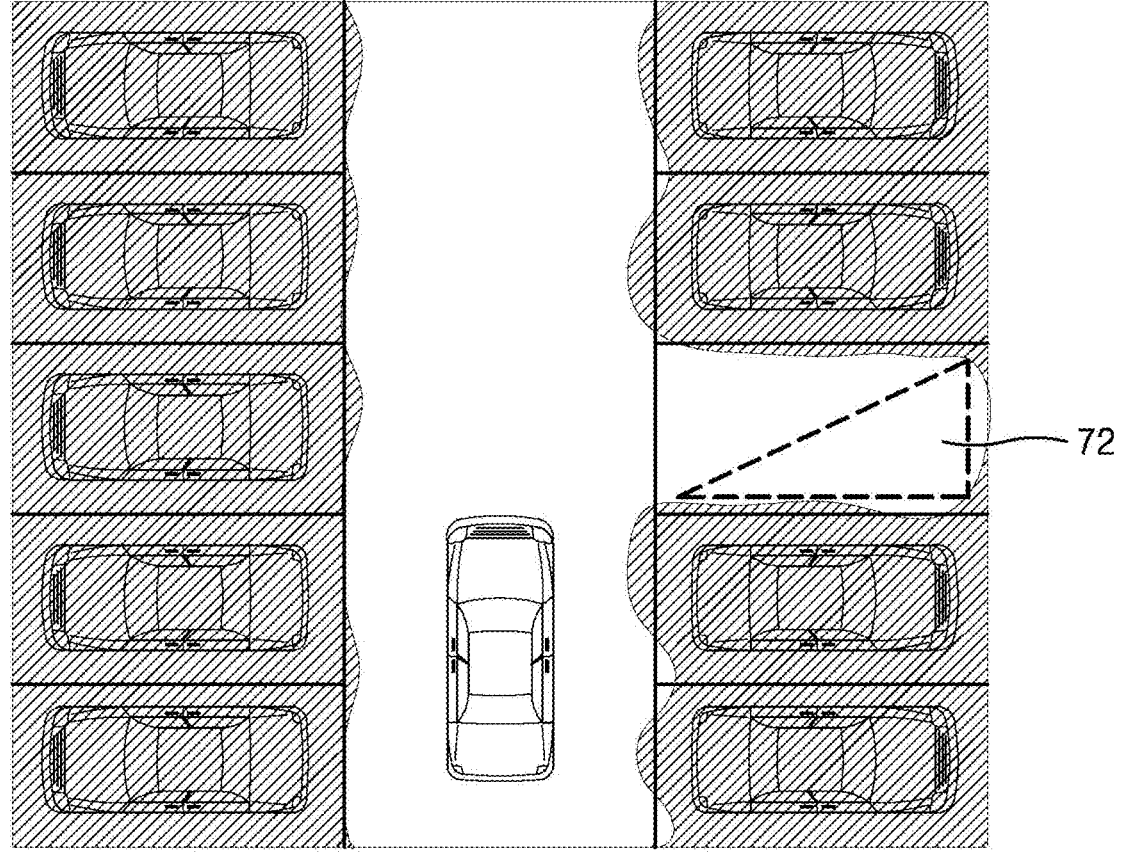

FIGS. 7A and 7B illustrate an example for removing blind spots in a vehicle control apparatus by using information collected through an in-vehicle attached sensor and an out-of-vehicle infrastructure sensor.

According to the present disclosure, through an obstacle and a traveling-possible area recognized in real time based on a low-distortion image collected with a bird's-eye-view using an infrastructure sensor, accurate position identification, obstacle avoidance, and collision prevention may be possible, enabling safe parking.

First, referring to FIG. 7A, when the vehicle control apparatus 400 uses information based on the in-vehicle attached sensor, a blind spot 71 may be formed due to an obstacle.

Next, referring to FIG. 7B, the vehicle control apparatus 400 according to an embodiment of the present disclosure may accurately recognize an area 72 from which the blind spot is removed, based on information collected using the in-vehicle attached sensor and the out-of-vehicle infrastructure sensor.

Figure 8A:
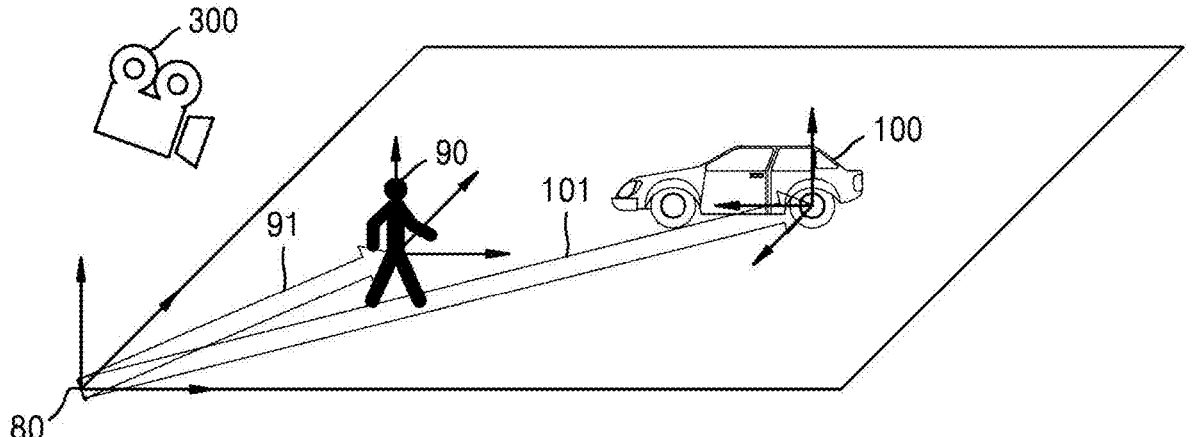
FIGS. 8A and 8B illustrate an example of, in a vehicle control apparatus, recognizing an obstacle using information collected through an in-vehicle attached sensor and an out-of-vehicle infrastructure sensor.
Figure 8B:
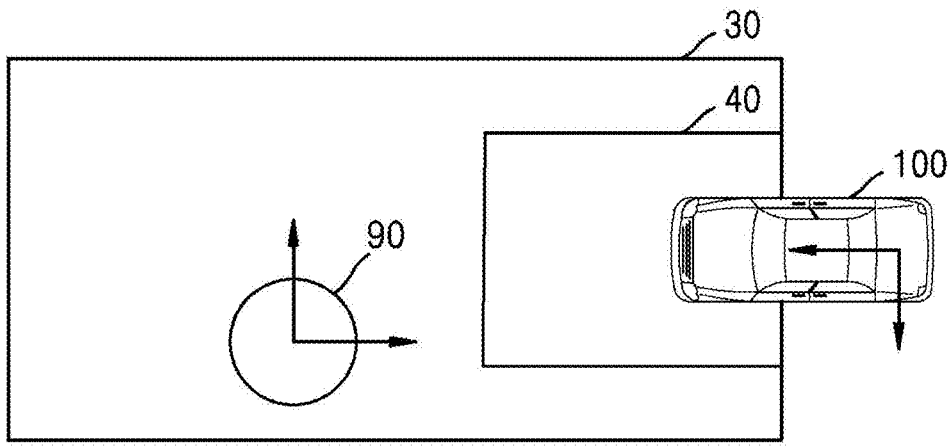

FIGS. 8A and 8B illustrate an example of, in a vehicle control apparatus, recognizing an obstacle by using information collected through an in-vehicle attached sensor and an out-of-vehicle infrastructure sensor.

First, referring to FIG. 8A, the vehicle control apparatus 400 according to an embodiment of the present disclosure may create a coordinate system or a map with respect to an origin 80 of a parking lot through the information collected using the infrastructure sensor 300. For example, the origin 80 of the parking lot may be a preset position. For example, the vehicle control apparatus 400 may recognize an obstacle and a hazard, which are preset near the autonomous vehicle and the parking space, and convert the coordinate system of the recognized information into a coordinate system on a parking lot map with the matching origin.

For example, the vehicle control apparatus 400 may obtain information about positions and directions of an obstacle 90 and the vehicle 100 by using the infrastructure sensor 300. For example, as shown in FIG. 8A, the vehicle control apparatus 400 may obtain the position of the obstacle 90 by using a vector 91 from the origin 80 to the obstacle 90. The vehicle control apparatus 400 may obtain the position of the vehicle 100 by using a vector 101 from the origin 80 to the vehicle 100. The vehicle control apparatus 400 may also obtain information about a distance and a direction between the obstacle 90 and the vehicle 100 based on the positions of the obstacle 90 and the vehicle 100.

Referring to FIG. 8B, the vehicle control apparatus 400 according to an embodiment of the present disclosure may correct a position and a posture of the vehicle with respect to the obstacle by using a combination of a map 40 created using information obtained from the in-vehicle sensor and a map 30 created using information obtained from an out-of-vehicle infrastructure sensor, thereby enabling accurate available parking space recognition, route planning, and follow-up driving, and thus improving an autonomous parking success rate and allowing safe and efficient driving and parking.

The present disclosure is applicable to an autonomous vehicle in a parking lot and a fall-back solution for a pedestrian based on real-time control connection. Moreover, according to the present disclosure, an expanded obstacle map may allow preemptive avoidance of a blind spot and a suddenly-appearing obstacle, thereby improving driving safety.

According to the present disclosure, it is possible to provide a motion planning algorithm which improves a parking spot recognition rate by accurately obtaining directions and sizes of fixed parking spots of the parking lot, a position and a size of a surrounding obstacle, a position and a posture of the vehicle relative to the obstacle, and enables precise parking by creating and following an accurate parking route.

Furthermore, according to the present disclosure, due to a point of view based on a bird's-eye-view using an infrastructure sensor, a blind spot of a vehicle-mounted sensor may be removed.

The apparatus and/or system described above may be implemented by a hardware component, a software component, and/or a combination of the hardware component and the software component. The apparatus and components described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software.

For convenience of understanding, it is described that one processing device is used, but those of ordinary skill in the art would recognize that the processing device includes a plurality of processing elements and/or a plurality of types of processing elements. For example, the processing device may include a plurality of processors or one processor and one controller. Alternatively, other processing configurations such as parallel processors may be possible.

Software may include a computer program, a code, an instruction, or a combination of one or more thereof, and may configure a processing device to operate as desired or independently or collectively instruct the processing device.

The software and/or data may be permanently or temporarily embodied in any type of machine, component, physical device, virtual equipment, computer storage medium or device, or signal wave to be transmitted, so as to be interpreted by or to provide instructions or data to the processing device. The software may be distributed over computer systems connected through a network and may be stored or executed in a distributed manner. The software and data may be stored in one or more computer-readable recording media.

The method according to the embodiments may be implemented in the form of program commands that can be executed through various computer components and recorded in a computer-readable recording medium. The computer-readable recording medium may include a program command, a data file, a data structure, etc., alone or in a combined manner. The program command recorded in the medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. The present disclosure is not limited thereto, and the examples of the computer-readable recording medium may include a virtual storage and recording medium such as cloud.

Examples of the program command may include not only a machine language code created by a complier, but also a high-level language code executable by a computer using an interpreter. The foregoing hardware device may be configured to be operated as at least one software module to perform an operation of the embodiments, or vice versa.

Although the present disclosure has been described with reference to an example shown in the drawings, it will be understood by those of ordinary skill in the art that various modifications and equivalent other examples may be made from the shown example. Accordingly, the true technical scope of the present disclosure should be defined by the technical spirit of the appended claims.

The invention claimed is:

1. A system for controlling the parking of an autonomous vehicle, the system comprising a vehicle control device comprising a processor and a memory storing instructions executable by the processor, wherein the processor is further configured to execute the instructions to:

obtain information related to the parking of the autonomous vehicle from a sensor within the autonomous vehicle and from an infrastructure sensor outside the autonomous vehicle;

obtain first obstacle information regarding an absolute position and a size of an obstacle in space measured by the infrastructure sensor, second obstacle information regarding a relative position between the obstacle and the autonomous vehicle, and third obstacle information regarding a relative direction of a front portion of the autonomous vehicle being oriented with respect to the obstacle;

verify the information obtained from the sensor within the autonomous vehicle, based on the first obstacle information, the second obstacle information, and the third obstacle information;

eliminate any blind spots of the sensor within the autonomous vehicle, based on the first obstacle information, the second obstacle information, and the third obstacle information;

determine a parking space, based on the information related to the parking of the autonomous vehicle;

set a parking route from a current position of the autonomous vehicle to the parking space; and control the parking of the autonomous vehicle, based on the parking route.

2. The system of claim 1, wherein the processor is further configured to execute the instructions to:

obtain information about a position of the autonomous vehicle in space measured by the infrastructure sensor, and the direction in which the front portion of the autonomous vehicle is oriented; and obtain information about the absolute and relative positions of at least one available parking space for the autonomous vehicle in space measured by the infrastructure sensor, as well as the size and the orientation of the available parking space.

3. The system of claim 2, wherein the processor is further configured to execute the instructions to:

Determine parking space an available parking space corresponding to a safe travel route calculated based on the position and the direction of the autonomous vehicle, the absolute and relative positions of the available parking space, and the size and the parking direction of the available parking space; and plan and set the parking route to the determined parking space.

4. The system of claim 3, wherein the processor is further configured to execute the instructions to compare the parking route with a current position of the autonomous vehicle in real time and thereby adjust the parking route as needed.

5. A non-transitory computer-readable recording medium storing a computer program that, when executed by a processor, causes the processor to perform operations defined in claim 1.

6. A method of controlling the parking of an autonomous vehicle, the method being performed by a vehicle control device comprising a processor and a memory, the method comprising:

obtaining information related to the parking of the autonomous vehicle from a sensor within the autonomous vehicle and from an infrastructure sensor outside the autonomous vehicle;

obtaining first obstacle information regarding an absolute position and a size of an obstacle in space measured by the infrastructure sensor, second obstacle information regarding a relative position between the obstacle and the autonomous vehicle, and third obstacle information regarding a relative direction of a front portion of the autonomous vehicle being oriented with respect to the obstacle;

verifying the information obtained from the sensor within the autonomous vehicle, based on the first obstacle information, the second obstacle information, and the third obstacle information;

eliminating any blind spots of the sensor within the autonomous vehicle, based on the first obstacle information, the second obstacle information, and the third obstacle information;

determining a parking space, based on the information related to parking of the autonomous vehicle, and setting a parking route from a current position of the autonomous vehicle to the parking space; and controlling the parking of the autonomous vehicle, based on the parking route.

7. The method of claim 6, wherein the obtaining of the parking-related information of the autonomous vehicle comprises:

obtaining information about the position of the autonomous vehicle in space as measured by the infrastructure sensor, and the direction in which the front portion of the autonomous vehicle is oriented; and obtaining information about the absolute and relative positions of at least one available parking space for the autonomous vehicle as measured by the infrastructure sensor, including the size and parking orientation of the available parking space.

8. The method of claim 7, wherein setting the parking route comprises determining parking space an available parking space as the parking space, corresponding to a safe travel route calculated based on the position and the direction of the autonomous vehicle, the absolute and relative positions of the available parking space, and the size and the parking orientation of the available parking space, and planning and setting the parking route to the parking space.

9. The method of claim 8, wherein controlling the parking comprises comparing the parking route with the current position of the autonomous vehicle in real-time and thereby adjusting the parking route as needed.

10. A non-transitory computer-readable recording medium storing a computer program computer for executing the method of claim 6 by using a computing device.

*   *   *   *   *